United States Patent
Phelan et al.

(10) Patent No.: US 9,244,680 B2
(45) Date of Patent: Jan. 26, 2016

(54) DOCUMENT QUALITY REVIEW AND TESTING

(71) Applicant: International Business Machines Corporation, Armonk, NY (US)

(72) Inventors: Elizabeth A. Phelan, Skerries (IE); Michelle M. Purcell, Tullamore (IE); Annette E. Sohor, Lucan (IE); Conor K. Tuohy, Monkstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 13/930,293

(22) Filed: Jun. 28, 2013

(65) Prior Publication Data

US 2015/0007137 A1    Jan. 1, 2015

(51) Int. Cl.
G06F 9/44    (2006.01)

(52) U.S. Cl.
CPC ........................................ *G06F 8/73* (2013.01)

(58) Field of Classification Search
None
See application file for complete search history.

(56) References Cited

U.S. PATENT DOCUMENTS

| | | | |
|---|---|---|---|
| 6,456,308 B1 * | 9/2002 | Agranat et al. | 715/854 |
| 7,100,150 B2 | 8/2006 | Polk | |
| 8,117,533 B2 * | 2/2012 | Adler et al. | 715/234 |
| 8,140,463 B2 * | 3/2012 | Robson et al. | 706/50 |
| 8,381,095 B1 * | 2/2013 | Fischer | 715/234 |
| 8,707,172 B2 * | 4/2014 | Hagelund | 715/265 |
| 2003/0078949 A1 * | 4/2003 | Scholz et al. | 707/505 |
| 2004/0031015 A1 * | 2/2004 | Ben-Romdhane et al. | 717/107 |
| 2006/0080639 A1 * | 4/2006 | Bustelo et al. | 717/111 |
| 2006/0090154 A1 * | 4/2006 | Bustelo et al. | 717/110 |
| 2006/0107225 A1 * | 5/2006 | Jones et al. | 715/764 |
| 2007/0277101 A1 * | 11/2007 | Barber et al. | 715/539 |
| 2008/0082959 A1 * | 4/2008 | Fowler | 717/104 |
| 2008/0082966 A1 * | 4/2008 | Dorn et al. | 717/120 |
| 2008/0109723 A1 * | 5/2008 | Burton et al. | 715/708 |
| 2008/0313208 A1 * | 12/2008 | Hourselt et al. | 707/102 |
| 2009/0037830 A1 * | 2/2009 | Kulkarni et al. | 715/764 |
| 2009/0125804 A1 * | 5/2009 | Brown et al. | 715/239 |
| 2009/0125820 A1 * | 5/2009 | Finocchio | 715/760 |
| 2009/0271711 A1 * | 10/2009 | Hartshorn et al. | 715/751 |
| 2010/0153385 A1 * | 6/2010 | Chaturvedi | 707/729 |
| 2010/0191721 A1 * | 7/2010 | Murthy | 707/723 |
| 2010/0325528 A1 * | 12/2010 | Ramos et al. | 715/230 |
| 2011/0010644 A1 * | 1/2011 | Merrill et al. | 715/762 |
| 2011/0113327 A1 * | 5/2011 | Hagelund | 715/265 |
| 2011/0161312 A1 * | 6/2011 | Wallman | 707/722 |

(Continued)

FOREIGN PATENT DOCUMENTS

WO    2008063797 A2    5/2008

*Primary Examiner* — Don Wong
*Assistant Examiner* — Roberto E Luna
(74) *Attorney, Agent, or Firm* — Yeen Tham; Arnold B. Bangali

(57) ABSTRACT

A method for examining document of a software product against a list of strings files of an interface of the software product to detect whether the document includes list of strings of the interface is provided. The method includes determination of source files of the document. The method further includes a search for string files of the interface that are present in the document. The method further includes comparison of the string files against the source files. Responsive to the comparison, if no match of the source files and the string files is found, an invalid status of the document is found, and wherein if a match is found, the document is flagged with a valid status.

20 Claims, 6 Drawing Sheets

(56) References Cited

U.S. PATENT DOCUMENTS

| | | | |
|---|---|---|---|
| 2011/0314402 A1* | 12/2011 | Kikin-Gil et al. | 715/772 |
| 2012/0131567 A1* | 5/2012 | Barros et al. | 717/170 |
| 2012/0192058 A1* | 7/2012 | Hagelund | 715/230 |
| 2012/0221593 A1* | 8/2012 | Trese et al. | 707/769 |
| 2012/0272221 A1* | 10/2012 | Pessoa et al. | 717/127 |
| 2013/0117660 A1* | 5/2013 | Fischer | 715/234 |

* cited by examiner

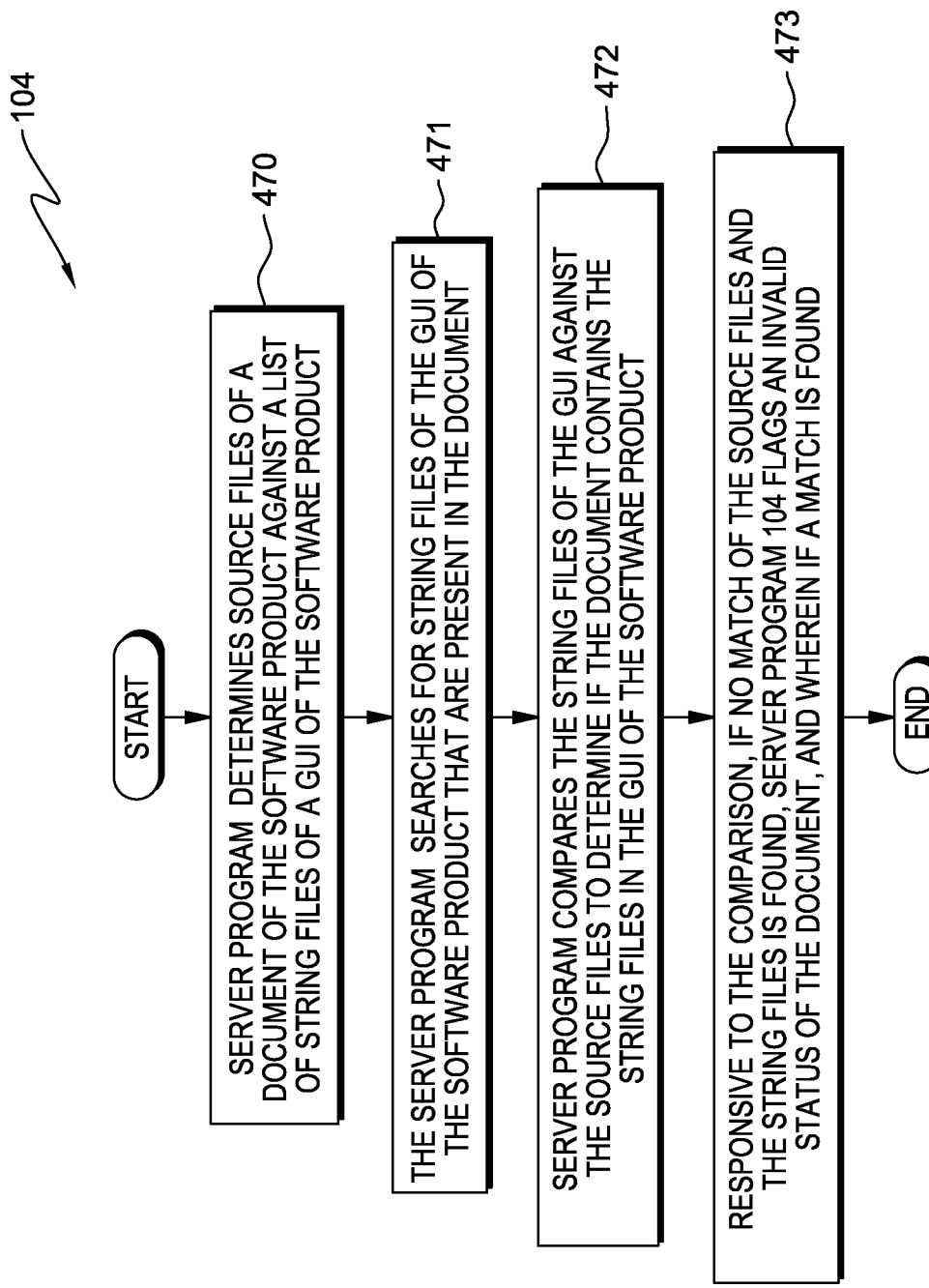

DOCUMENT QUALITY REVIEW AND TESTING

FIELD OF THE INVENTION

The present invention relates generally to computing systems, and more particularly to document quality review of software documentation that accompanies a software product.

BACKGROUND

Software development life-cycle (SDLC) is a structure imposed on the development of a computer software product. Documenting a computer software product for the purpose of future maintenance and enhancement is done throughout the SDLC. The process of documenting software development cycle is generally known as software documentation. Software documentation either describes how the computer software product operates or how to use it. Common forms of software documentation include electronic reference texts, on-line help files, man pages, reference manuals, comments within source code, etc. Software documentation may also be created in a variety of forms, such as, computer files, which may be accessible through web browser editors, etc., or the software documentation may be in hard copy form, such as a book or technical manual. Software documentation can also include errors or omissions that can lead to errors displayed to end-users, and consequent system failures of the computer software product, or even failure in the market place if the software documentation does not accurately accompany the software product. Therefore, managers and software engineers typically focus attention to software documentation and its associated costs if the software documentation does not accurately provide concrete descriptions of the software product.

Moreover, most software development cycles generate large amounts of associated software documentation that accompanies the computer software product. However, quite often computer software deployment can be complex with many installation and implementation options to choose from, which can affect quality production of the software documentation. Poor quality software documentation can further result in deployment or functionality issues, customer dissatisfaction with software products, risk of losing a customer to a competitor, and increase in the demand for technical support resources. In order to publish good quality software documentation, the software documentation must reflect the final product that is shipped. Generally, to achieve this, the project of the software development cycle needs to devote time and resources at the end of the cycle to thoroughly review the documentation and compare the software documentation with the final software computer product that is finalized and shipped.

SUMMARY

In one embodiment of the present invention, a method for examining a document of a software product against a list of string files of an interface of the software product to detect whether the document includes list of strings of the interface is provided. The method comprises, determining, by one or more computer processors, source files of the document. The method further comprises searching, by the one or more computer processors, for string files of the interface that are present in the document. The method further comprises comparing, by the one or more computer processors, the string files against the source files. The method further comprises, responsive to the comparison, if no match of the source files and the string files is found, flagging, by the one or more computer processors, an invalid status of the document, and wherein if a match is found, the document is flagged with a valid status.

In another embodiment of the present invention, a computer system for examining a document of a software product against a list of string files of an interface of the software product to detect whether the document includes list of strings of the interface. The computer system comprises, one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to determine source files of the document. The computer system further comprises program instructions to search for strings files of the interface that are present in the document. The computer system further comprises program instructions to compare the string files against the source files. The computer system further comprises, responsive to the comparison, if no match of the source files and the string files is found, program instructions to flag an invalid status of the document, and wherein if a match is found, the document is flagged with a valid status.

In yet another embodiment of the present invention, a computer program product for examining a document of a software product against a list of string files of an interface of the software product to detect whether the document includes list of strings of the interface. The computer program product includes one or more computer-readable tangible storage devices and program instructions stored on at least one of the one or more storage devices. The program instruction comprises program instructions to determine source files of the document. The program instructions further comprises program instructions to search for string files of the interface that are present in the document. The program instruction further comprises program instructions to compare the string files against the source files. Responsive to the comparison, if no match of the source files and the string files is found, program instructions to flag an invalid status of the document, and wherein if a match is found, the document is flagged with a valid status.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein, like reference numerals indicate like components, and:

FIG. 4A-4B illustrates embodiments of flow diagrams executed by a server program to examine a document of a software product against a list of string files of an interface of the software product in accordance with embodiments of the present invention.

DETAILED DESCRIPTION

Figure 1:
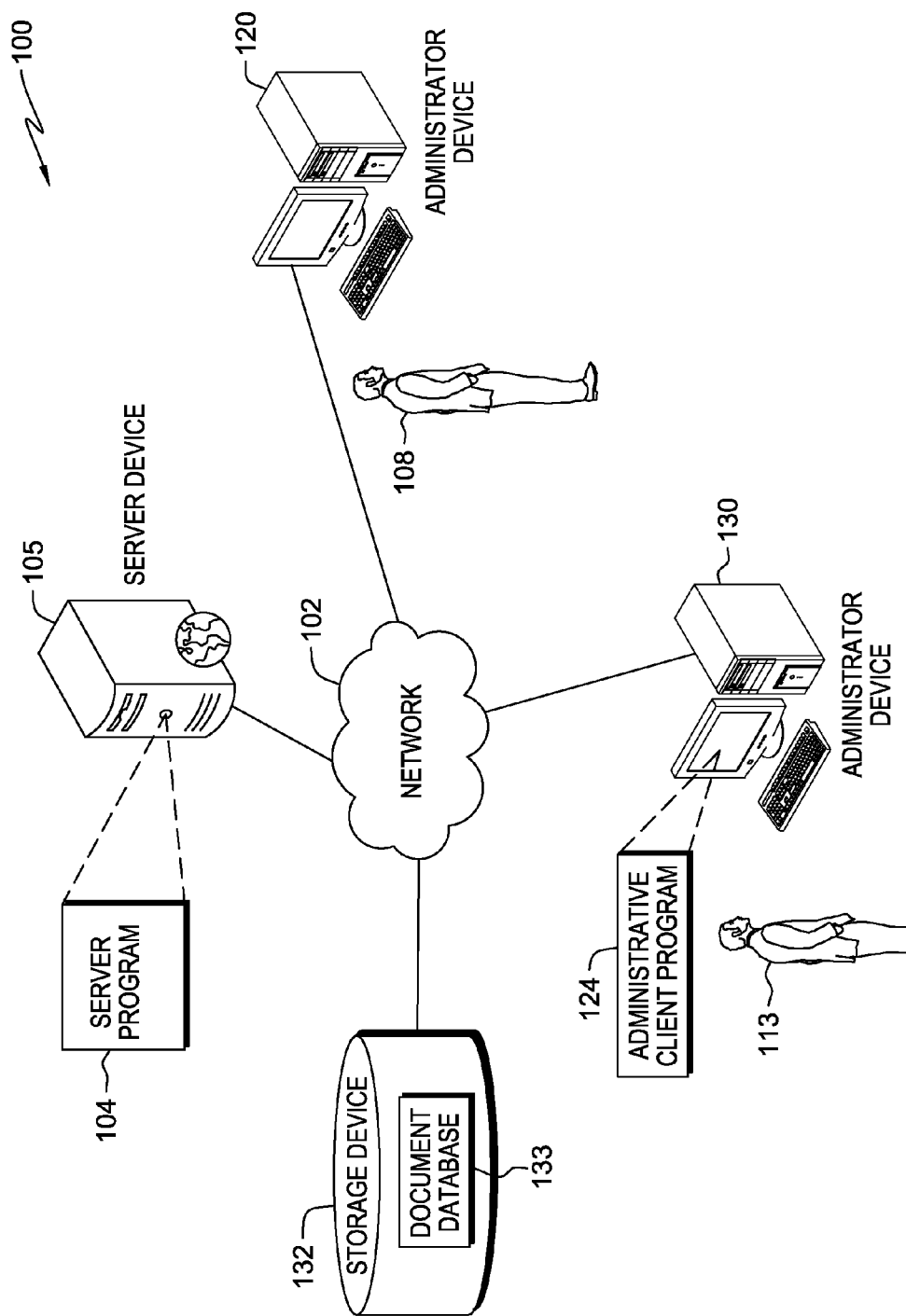
FIG. 1 is a functional block diagram of a document review system for analyzing software documentation that is declared in a graphical user interface (GUI) of a software product that the software document is associated with in accordance with embodiments of the present invention

Embodiments of the present invention include one or more circuits or subassemblies of circuits, as well as, methods of operation that are executed to detect whether software documentation that accompanies a software product accurately documents defined list of strings of a graphical user interface (GUI) of the software product. The present invention further provides examination of the software documentation, which can be defined in extensible markup language (XML), against the defined list of strings that are declared in the GUI of the software product that the documentation is associated with. If the documentation comprises an instruction that references a GUI element of the software product that does not exist in the GUI, an error flag is raised, in accordance with embodiments of the present invention.

XML is a markup language that defines a set of rules for encoding documents in a format that is both human-readable and machine-readable. In particular, according to at least one embodiment, quality of the software documentation is analyzed by identifying references of the defined list of GUI elements of the software product that is present within the software document by using a tagging mechanism. For example, as described, reference to GUI elements in the software documents are compared with the defined list of strings that appear in the GUI of the software product, and also, an error is generated if the software document has references to GUI elements that are not present in the GUI of the software product. Moreover, any reference in the documentation to an element in the GUI of the software product can be tagged with a specific identifier, including, for example, uicontrol <unicontrol>, identifier. The GUI could include GUI string files, which could be a list of strings that appear in the GUI of the software product.

Moreover, examination of the software product against the software document could be run or executed continually throughout software development life-cycle (SDLC) of the software product, to continually enhance and improve aspects of the documentation that refers to the GUI of the software product. Further, for example, the examining process would reduce the requirement for developers, testers, or architects of the software product to repetitively review content of the software documentation for GUI accuracy of the software product. For example, embodiments of the present invention further include development process to utilize and leverage information that is already defined in the software product code implementation without the need for human intervention or manual processing. Embodiments of the present invention could further be triggered to operate every time a new version of the software documentation or product source code of the software product or program is generated.

Embodiments of the present invention could also further operate to determine whether or not the documentation is of a high enough quality to be published. According to at least one embodiment the present invention, a system reads source doc files of the software document, and searches for all strings that are embedded in a unicontrol tag of the software product. The system further compares the unicontrol string with all entities listed in the GUI string file of the software product. If no match is found in the document, the unicontrol tagged string is flagged with a status of invalid. However, if a match is found in the document, the unicontrol tagged string is flagged with a status of valid. Moreover, if more than one GUI matches are found in the document, the system sets a flag of ambiguous. In at least one embodiment, when all unicontrol strings have been processed and compared with the latest GUI string file, the system further provides a result of the quality of the documentation. The system outputs a conclusion or result on the quality of the software documentation detailing the unicontrol tagged strings that have inaccuracies or errors. Further the system lists or displays each of the strings that are contained in the software document that does not match the latest version of the GUI of the software product.

The present invention will now be described in conjunction with the Figures. Referring to FIG. 1, document review system 100 for analyzing software documentation that is declared in a graphical user interface (GUI) of a software product that the software document is associated with, in accordance with embodiments of the present invention, is shown.

Document review system 100 comprises network 102, administrator devices 130, 120, server device 105, and storage device 132. Administrator devices 120, 130, and storage device 132 are clients to server device 105, interconnected over network 102. Administrator devices 120, 130 and storage device 132 operate over network 102 with server device 105 to facilitate analysis of software documentation that is declared in a user interface of a software product that the software document is associated with. For example, document review system 100 detects whether or not a document that accompanies a software product accurately documents all defined lists of strings in a graphical user interface of the software product.

Administrator devices 120, 130 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively administrator devices 120,130 comprises administrative client program 124. Administrative client program 124 can be any type of software application in which definition of a type or title of a tag that is used to identify a graphical user interface (GUI) string of a software product, of which a document that is associated with the software product is defined. Further, administrators 113, 108, can define what constitutes a GUI string of the software product that can be identified in the software document.

Server device 105 can be, for example, a server computer system such as a management server, a web server, or any other electronic device or computing system capable of receiving and sending data during detection of whether or not a document that accompanies a software product accurately documents all defined lists of strings in a graphical user interface of the software product in document review system 100. Server device 105 can also represent a "cloud" of computers interconnected by one or more networks, wherein server device 105 can be a primary server for a computing system utilizing clustered computers when accessed through network 102. For example, a cloud computing system can be an implementation of a document review system for analyzing software documentation that are declared in a user interface of a software product that the software document is associated with, including, for example, detecting whether or not a document that accompanies a software product accurately documents all defined lists of strings in a graphical user interface of the software product.

Server device 105 includes server program 104. Server program 104 performs all necessary functions to detect whether or not a document that accompanies a software product accurately documents all defined lists of strings in a graphical user interface of the software product. Storage device 132 can be any type of storage device, storage server, storage area network, redundant array of independent discs (RAID), cloud storage service, or any type of data storage. Storage device 132 includes document database 133. Document database 133 is a database that stores information pertaining to comparison software documentation XML that is compared against a list of strings that are declared in the GUI of the software product that the documentation by server program 104.

Network 102 includes one or more networks of any kind that can provide communication links between various devices and computers connected together within document review system 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. For example, document review system 100 can utilize the Internet with network 102 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

Figure 2:
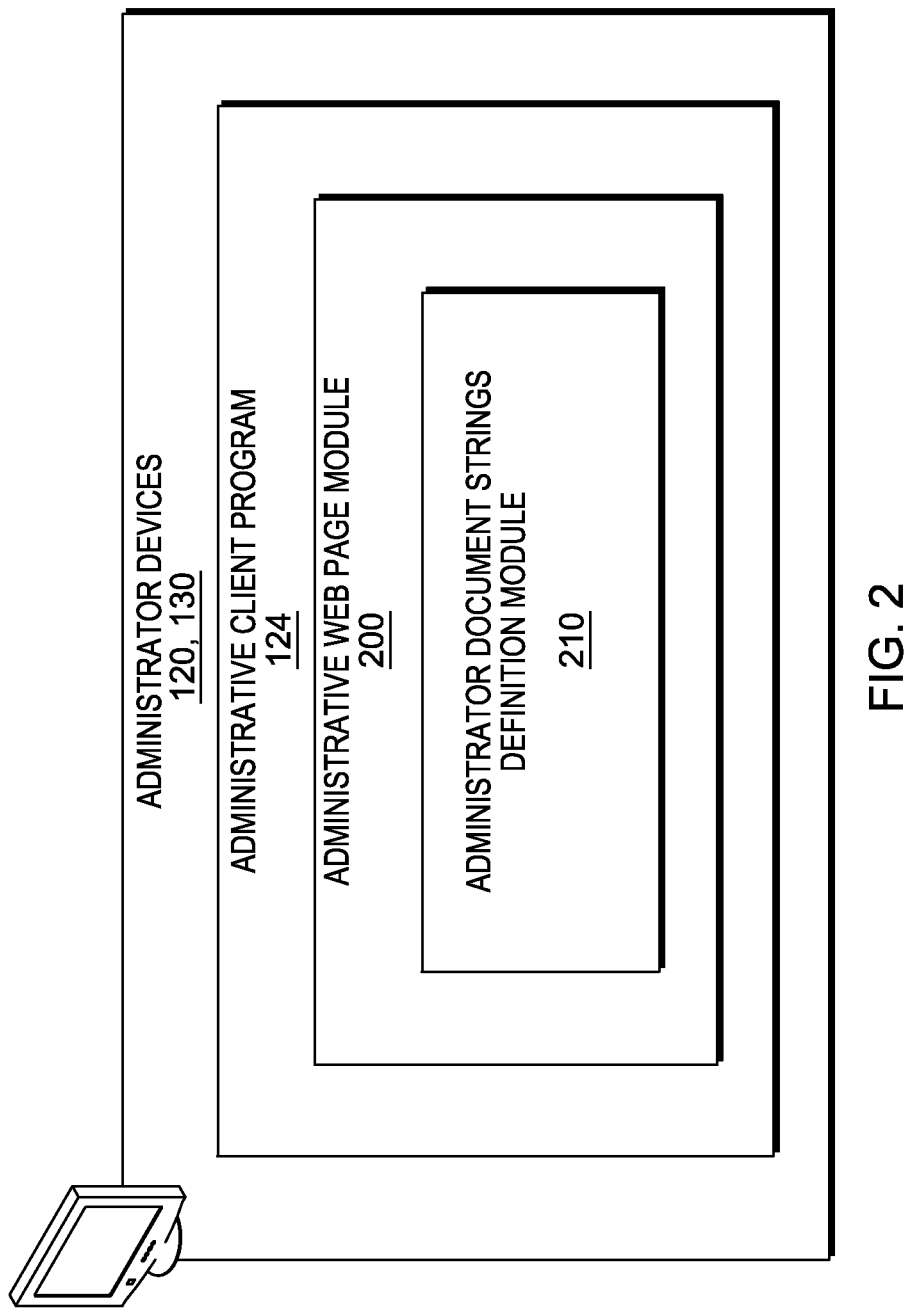
FIG. 2 is a functional block diagram illustrating program components of administrator devices for viewing compiled analyses software documentation that is declared in a GUI of a software product in accordance with embodiments of the present invention.

FIG. 2 is a functional block diagram illustrating program components of administrator devices 120, 130, in accordance with embodiments of the present invention.

Administrative client program 124 can, among other things, retrieve and display content accessible via network 102, such as web pages. Administrative client program 124 can be a web browser. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively. Administrative client program 124 comprises administrative web page module 200. Administrative web page module 200 is a web browser plugin/add-on that extends the functionality of administrative client program 124 by adding additional user interface elements to a user interface of administrative client program 124. The additional user interface elements allow system administrators 108, 113 to define a type and title of a tag that is used to identify a GUI string of the software product that is also defined in the software document.

Administrative web page module 200 comprises a web page received in administrative client program 124 from server program 104. For example, using the additional user interface elements defined by administrators 108, 113, in administrative client program 124, server program 104 detects whether software documentation that accompanies the developed software product accurately documents defined list of strings of a graphical user interface (GUI) of the software product. The web page received in administrative client program 124, includes for example, program code, such as Hypertext Markup Language (HTML) code or JavaScript code that, when executed, adds one or more user interface elements to administrative client program 124. Administrative web page module 200 further comprises administrator document strings definition module 210. Administrative document strings definition module 210 is a web browser plugin/add-on that extends the functionality of administrative web page module 200 by adding additional user interface elements to a user interface of administrative web page module 200.

For example, administrator document strings definition module 210 provides a user interface that allows administrators 108, 113 to define a type and title of a tag that is used to identify a GUI string of the software product that is also defined in the software document. Moreover, server program 104 correlates with administrator document strings definition module 210 to dynamically perform comparison of a search of related content of the defined type and title of a tag that is used to identify a GUI string of the software product that matches unicontrol strings of software document, as described in further details below.

Figure 3:
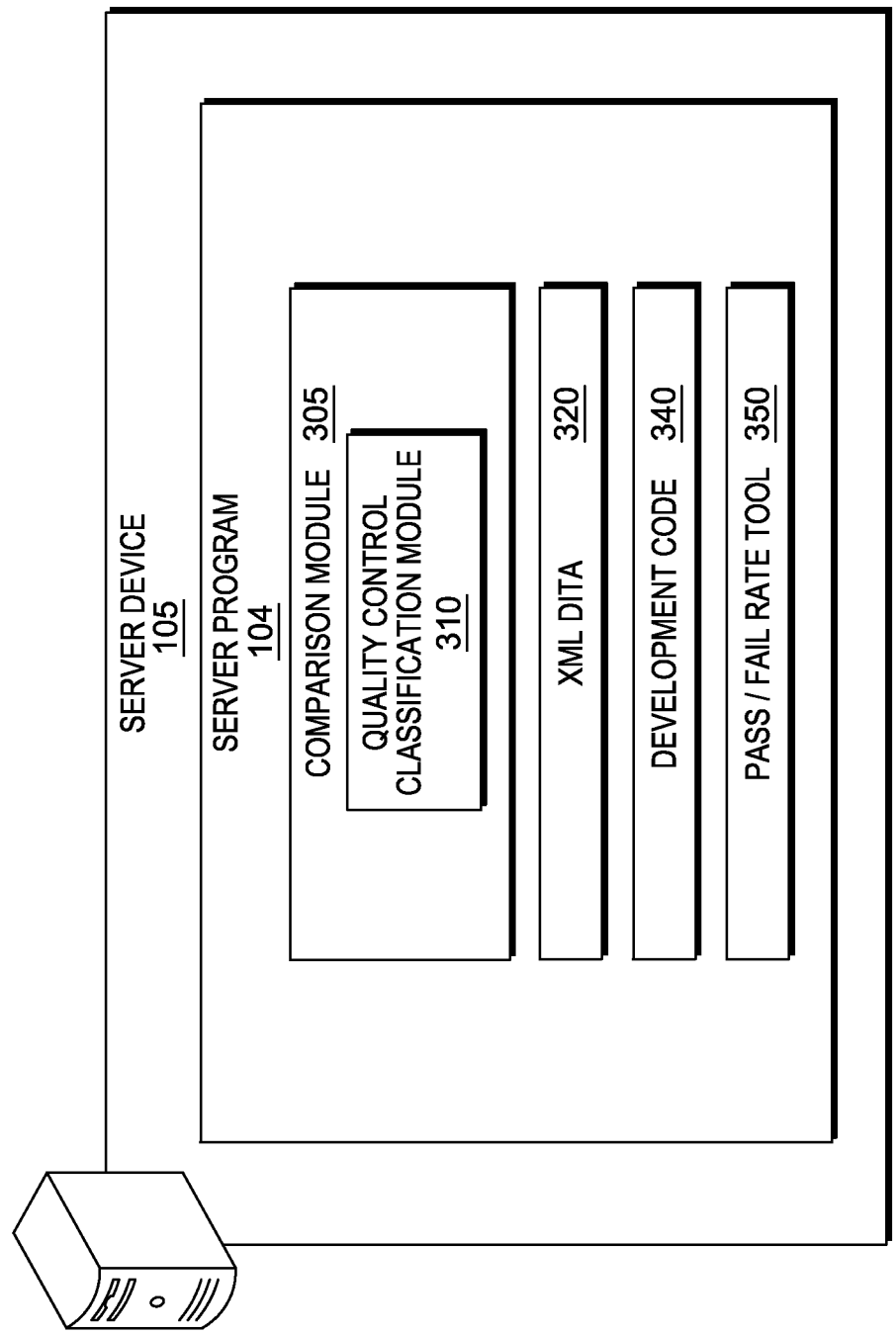
FIG. 3 is a functional block diagram illustrating program components of a server device in accordance with embodiments of the present invention.

FIG. 3 is a functional block diagram illustrating program components of server device 105 in accordance with embodiments of the present invention.

Server program 104 performs functions to compare documentation, which can be defined in extensible markup language (XML), against defined list of strings that are declared in the GUI of the software product that the documentation is associated with.

Server program 104 includes comparison module 305, extensible markup language (XML) Darwin Information Typing Architecture (DITA) 320, development source code 340 and pass/fail rate tool 350. Comparison module 305 compares documentation source files of documents associated with a software product that is associated with GUI components of the software product. The documents are tested and verified for accuracy during software development cycle of the software product by comparison module 305. For example, comparison module 305 analyzes the document to verify if the document contains references to any user interface elements of the software product, such as dialogue boxes, menu items, field names, and action buttons that are not listed in the software source code of the software product. If the document does not contain such references, an error message or invalid message is generated by comparison module 305. For example, comparison module 305 calculates total number of errors identified in the document to produce a quality score of the errors that are identified. Comparison module 305 then produces quality classification based on the score that is awarded, as described below. According to at least one embodiment, comparison module 305 compares GUI text strings in the software product, including, for example structured query language (SQL) file with the text strings in the document at that has been tagged as GUI elements of the software product. Comparison module 305 further identifies those strings in the documentation for which a match cannot be found in GUI elements of software product.

Comparison module 305 produces a report or result, which contains a listing of the text strings in the document that does not match the GUI elements of the software product, and also produces a statistical summary and an outcome in relation to a pre-defined pass/fail rate. Comparison module 305 includes quality control classification module 310.

Quality control classification module 310 analyzes quality classification of the documents based on the score that is awarded or allocated to the document that is associated with the software product. For example, during the early phase of development cycle of the software product, the quality benchmark of the document that is associated with the software product might need to be lower at the end of the development cycle of the software product. Quality control classification module 310 can further be customized by either of administrators 108, 113, according to requirements for production of quality document. Further, XML DITA 320 tags user interface elements of the software product that are present within the documentation. This allows comparison module 305 to distinguish references of the GUI elements of the software product. The present invention are not limited to DITA, in other embodiments of the present invention, XML DITA 320 can be in any data format.

For example, task oriented topic writing sourced in XML is a common approach for developing quality documentation. Moreover, the ability to tag and identify parts of the documentation by XML DITA 320 provides source input required of the documentation, which can be used to analyze source of the documentation that is required of the software product. Further, if the documented user interface control doesn't matches the GUI elements that are coded in the source code of the software product, then the documentation does not accurately describe the use interface elements of the software product.

Development code 340 is the software source code that implements software product for which documentation that is associated with the software product that is being developed. Development code 340 can be contained in one or more files. Development code 340 for a software product might be written in one or more programming languages. Development code 340 can further be a be sourced in Java® (Java is a trademark of Oracle Inc. in the United States, other countries, or both) source files, that contain code written in the Java programming language. Development code 340 can also be contained in structured query language (SQL) database files. For example, a representational state transfer (REST) application programming interface (API) might be implemented in the Java source files of development code 340. Further, REST API might also be documented in the software product. For example, comparison module 305 can be used to compare the REST documentation to the actual REST API implementation with which the documentation is being developed.

For example, the software product might have a web-based user interface for which the user interface text is implemented in a SQL db file, which is document code. The GUI is also documented in the software product. Comparison module 305 can be utilized to compare the text in the GUI of the software product with the text in the documentation of the software product.

Pass/fail rate tool 350 determines what kinds of strings are compared in the XML DITA 320 and development code 340, including, for example, string of the software product that are tagged as DITA <uicontrol> strings. Pass/fail rate tool 350 further determines if particular weighting is given to certain areas of the documentation of the software product that are considered more critical. Pass/fail rate tool 350 also determines what criteria are used to assess whether a checking process passed or failed. Pass/fail rate tool 350 can also determine which inputs, or sections of an input, are used in the assessment. It might also be assessed what score is required for a check process to be considered successful. In one embodiment, standards are defined for different stages of a project. At a particular stage in a project a pre-defined level of accuracy in the doc with respect to GUI strings is expected. The tool is set to pass if the required level of accuracy is reached. For example, pass rate tool can be a tool which can be used to assess the quality of documentation in source files of the software product, such as DITA XML files, Word etc. In another example, the tool can be configured to define which grammatical constructions are defined as correct, and which words are not allowed. It can also determine what percentage of grammatical mismatches causes the check to return a fail rating.

Figure 4A:
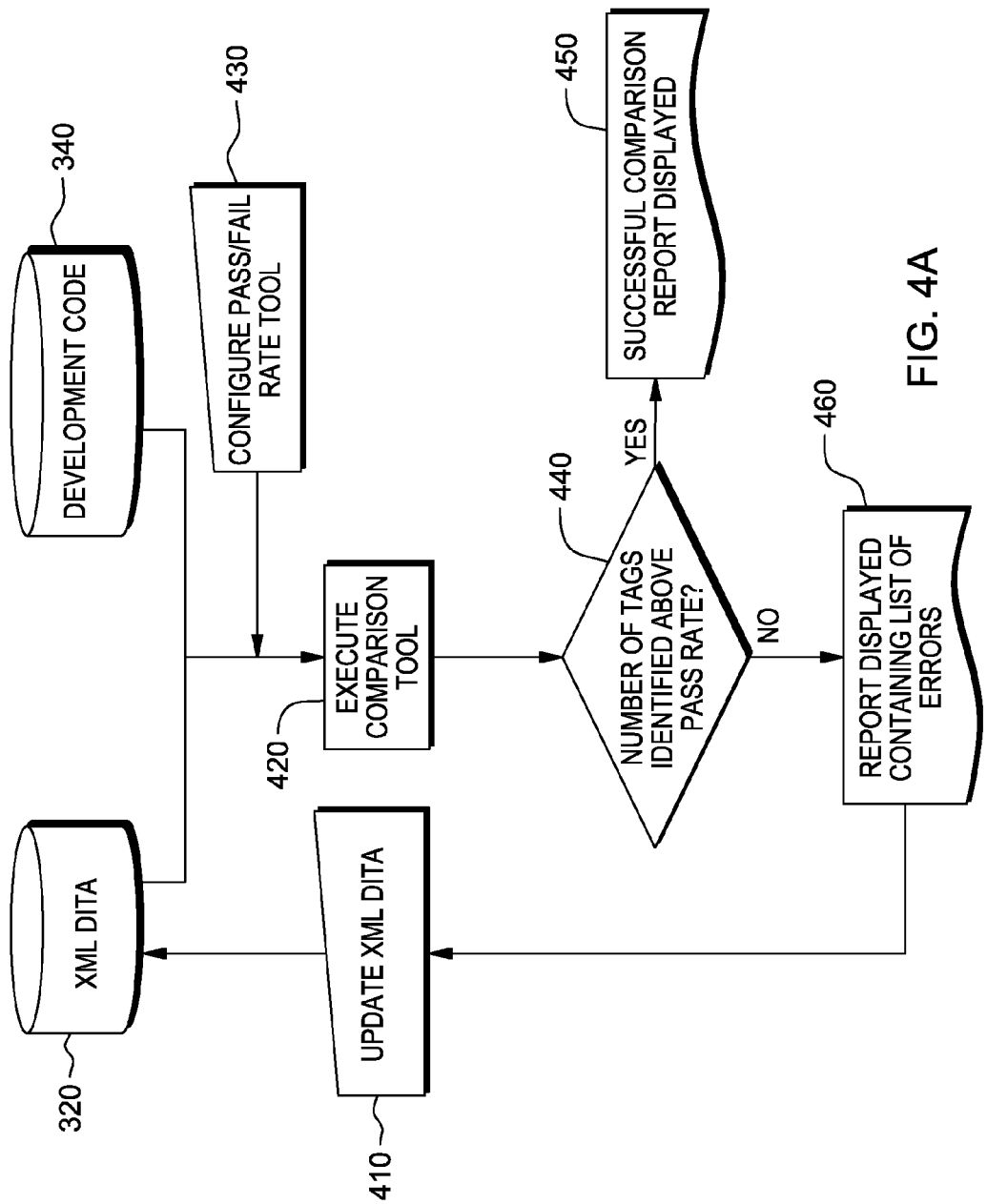

FIG. 4A illustrates an embodiment of a flow diagram executed by server program 104 to examine a document of a software product against a list of string files of an interface of the software product to detect whether the document includes list of strings of the interface of the software product, in accordance with embodiments of the present invention.

Server program 104 locates a path of documentation sources files that is associated with the software product. For example, the source files are in XML format, wherein XML DITA 320 provides source input required of the documentation, which can be used to analyze the source files of the documentation against GUI string elements of the software product. XML DITA 320 is commonly a commonly used source file format for technical documentation. XML DITA 320 allows tagging of content of document sources files.

For example, the tagged content of the source files can relate to GUI interface control <GUIicontrol> of the documentation. Moreover, server program 104 executes software GUI component development code 340, which contains, for example, all text that is visible in GUI of the software product. Further, development code 340 can be developed or structured using any method or process of developing the software product. For example, no development methodology of structuring development code 340 is required other than examination of source code files of development code 340, which contains GUI elements of the software product, which typically can be XML, SQL, or other source code property files. Further, server program 104 configures pass/fail rate tool 430, which allows server program 104 to classify documentation quality of the document of the software product, based on the number of errors that occur based on comparison of the document against the GUI strings of the software product.

Server program execute comparison tool 420, which reads documentation source file content of the document, and identifies any content that is tagged as a GUI control, <GUIicontrol>. Execute comparison tool 420 then compares the documentation source file content of the documents against GUI string elements of the software product. If the string element does not exist in the document, then server program 104 confirms that the document is inaccurate and contains errors. At decision 440, server program 104 determines number of tags of GUI element strings that are identified pass or does not contain errors based on comparison of the document source files against the GUI of the software product. If server program 104 determines that the number of tags identified are above the pass rate, then at step 450 a successful comparison report is transmitted by server program 104 for display on administrative devices 120, 130. However, if the numbers of tags identified are not above the pass rate, at step 460, server program 104 transmits a report containing list of errors of the comparison report to administrative device 120, 130. Further, once the report containing list of errors is transmitted, at step 410, server program 104 updates XML data 320 with the list of errors.

For example, at the end of the comparison process by execute comparison tool 420, the total number of errors resulting from the comparison is calculated. Further, classifications of the errors can be pass or fail, and also, grading to the comparison could also contain customized quality levels of the comparison process of execute comparison tool 420. The customization could include, for example, calculation of numbers or percentages of total GUI controls or elements strings of the software product that are scanned in the document. For example, the customization could further include, a setting such as, high, medium, and low, including, for example:

High quality=zero errors (or 0% errors) (All references to the user interface are 100% accurate)

Medium quality=5 errors (or between 1-5% errors)<=5 errors exist in the documentation set Low quality=>5 errors (or more than 5%) exist in the documentation set Server program 104 outputs quality results of the comparison on administrative devices 108, 113. For example, server program 104 displays quality classification providing detail of source files of documentation that incorrectly refers to element strings that do not exist in the GUI of the software product.

FIG. 4B illustrates an alternative embodiment of a flowchart depicting steps performed by server program 104 to examine a document of a software product against a list of string files of a graphical user interface (GUI) of the software product to detect whether the document includes list of strings of the interface of the software product, in accordance with embodiments of the present invention.

At step 470, server program 104 determines source files of a document of the software product against a list of string files of the GUI of the software product to detect whether the document includes list of strings of the interface of the software product.

At step 471, server program 104 searches for string files of the GUI of the software product that are present in the document. At step 472, server program 104 compares the string files of the GUI against the source files to determine if the document contains the string files in the GUI of the software product. Further, responsive to the comparison, if no match of the source files and the string files is found, at step 473, server program 104 flags an invalid status of the document, and wherein if a match is found, server program 104 flags the document with a valid status.

Figure 5:
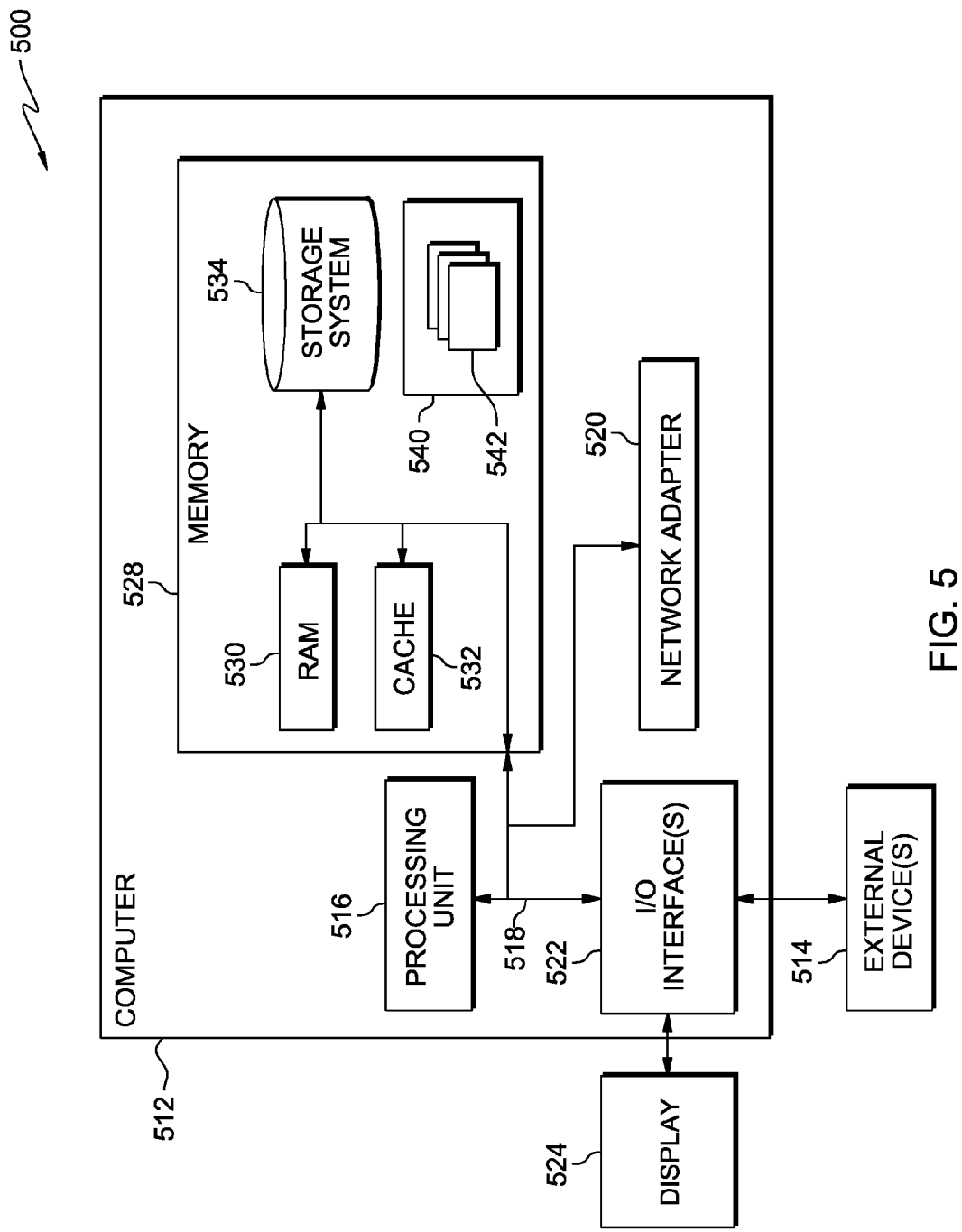
FIG. 5 is a functional block diagram of a computer system in accordance with embodiments of the present invention.

FIG. 5 is a functional block diagram of a computer system, in accordance with embodiments of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of administrator devices 120, 130, and server device 105 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Administrative client program 124 and server program 104 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of administrative client program 124 and server program 104 are implemented as or are an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for examining a document of a software product against a list of string files of an interface of the software product to detect whether the document includes list of strings of the interface, have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for examining a document of a software product, the method comprising the steps of:
   determining, by one or more computer processors, source files of the document searching, by the one or more computer processors, for string files of the interface that are present in the document, wherein the strings are embedded in a unicontrol tag of the document;

comparing, by the one or more computer processors, the string files against the source files, wherein unicontrol string with entities listed in an interface of the string file of the document are compared against the source files of the document; and responsive to the comparison, if no match of the source files and the string files is found, flagging, by the one or more computer processors, an invalid status of the document, and wherein if a match is found, the document is flagged with a valid status.

2. The method according to claim 1, further including the step of:

flagging, by the one or more computer processors, an ambiguous status of the document, if more than one match is found.

3. The method according to claim 1, wherein the flag of an invalid status of the document includes inaccuracies or errors of comparison of the string files against the source files.

4. The method according to claim 1, further including the step of:

displaying, by the one or more computer processors, each of the string files that are contained in the source files of the document that does not match the latest version of the interface of the software product.

5. The method according to claim 1, wherein the string files of the software product are compared against the source files of the document when a newer version of the document is created or a source code of the software product is created.

6. The method according to claim 5, wherein the document is dynamically assessed throughout development cycle of the software product to improve aspect of the document that accompanies an interface of the software product.

7. The method according to claim 1, wherein the source files of the document include extensible markup language for encoding the document.

8. A computer system for examining a document of a software product, the computer system comprising:

one or more processors, one or more computer-readable memories, one or more non-transitory computer-readable tangible storage devices and program instructions which are stored on at least one of the one or more storage devices for execution by at least one of the one or more processors via at least one of the one or more memories, the program instructions comprising:

program instructions to determine source files of the document;

program instructions to search for strings files of the interface that are present in the document, wherein the strings are embedded in a unicontrol tag of the document;

program instructions to compare the string files against the source files, wherein unicontrol string with entities listed in an interface of the string file of the document are compared against the source files of the document; and responsive to the comparison, if no match of the source files and the string files is found, program instructions to flag an invalid status of the document, and wherein if a match is found, the document is flagged with a valid status.

9. The computer system according to claim 8, further includes: program instructions to flag an ambiguous status of the document, if more than one match is found.

10. The computer system according to claim 8, wherein the flag of an invalid status of the document includes inaccuracies or errors of comparison of the string files against the source files.

11. The computer system according to claim 8 further includes: program instructions to display each of the string files that are contained in the source files of the document that does not match the latest version of the interface of the software product.

12. The computer system according to claim 8, wherein the string files of the software product are compared against the source files of the document when a newer version of the document is created or a source code of the software product is created.

13. The computer system according to claim 12, wherein the document is dynamically assessed throughout development cycle of the software product to improve aspect of the document that accompanies an interface of the software product.

14. The computer system according to claim 8, wherein the source files of the document include extensible markup language for encoding the document.

15. A computer program product for examining a document of a software product, the computer program product comprising:

one or more non-transitory computer-readable tangible storage devices and program instructions stored on at least one of the one or more storage devices, the program instructions comprising:

program instructions to determine source files of the document;

program instructions to search for strings files of the interface that are present in the document, wherein the strings are embedded in a unicontrol tag of the document;

program instructions to compare the string files against the source files, wherein unicontrol string with entities listed in an interface of the string file of the document are compared against the source files of the document; and responsive to the comparison, if no match of the source files and the string files is found, program instructions to flag an invalid status of the document, and wherein if a match is found, the document is flagged with a valid status.

16. The computer program product according to claim 15, further includes: program instructions to flag an ambiguous status of the document, if more than one match is found.

17. The computer program product according to claim 15 wherein the flag of an invalid status of the document includes inaccuracies or errors of comparison of the string files against the source files.

18. The computer program product according to claim 15 further includes: program instructions to display each of the string files that are contained in the source files of the document that does not match the latest version of the interface of the software product.

19. The computer program product according to claim 15, wherein the string files of the software product are compared against the source files of the document when a newer version of the document is created or a source code of the software product is created.

20. The computer program product according to claim 19, wherein the document is dynamically assessed throughout development cycle of the software product to improve aspect of the document that accompanies an interface of the software product.

* * * * *